United States Patent [19]

Conant et al.

[11] 4,125,640
[45] Nov. 14, 1978

[54] METHOD OF MANUFACTURING DEFECT FREE NICKEL ARMORED LABORATORY AND INDUSTRIAL BRITTLEWARE

[76] Inventors: Louis A. Conant, 218 Chapel Hill Dr., Rochester, N.Y. 14617; Wilbur M. Bolton, 162 Vollmar Pkwy., Rochester, N.Y. 14623; James E. Wilson, Box 123, Livonia, N.Y. 14487

[21] Appl. No.: 753,591

[22] Filed: Dec. 23, 1976

Related U.S. Application Data

[63] Continuation-in-part of Ser. No. 568,422, Apr. 21, 1975, abandoned.

[51] Int. Cl.$^2$ .................. C23C 11/02; B65D 1/02
[52] U.S. Cl. .................. 427/250; 65/60 A; 65/60 B; 65/60 C; 215/12 R; 427/255; 427/404; 427/407 A; 427/407 R; 428/35; 428/408
[58] Field of Search .......... 427/404, 250, 255; 215/12 R; 428/35, 408; 65/60A, 60 C, 60 B, 59 B

[56] References Cited

U.S. PATENT DOCUMENTS

| | | | |
|---|---|---|---|
| 242,471 | 6/1881 | Newton | 215/12 R |
| 514,426 | 2/1894 | Outerbridge | 23/292 |
| 2,006,226 | 6/1935 | Yaxley | 138/145 |
| 2,195,436 | 4/1940 | Weller | 23/292 X |
| 2,847,322 | 8/1958 | Drummond | 427/404 X |
| 3,041,202 | 6/1962 | Whitehurst | 427/404 X |
| 3,264,015 | 8/1966 | Mayers | 65/59 B |
| 3,403,006 | 9/1968 | Hersch | 23/292 |
| 3,476,586 | 11/1969 | Valtchev | 427/404 X |
| 3,645,777 | 2/1972 | Sierad | 427/404 X |
| 3,748,174 | 7/1973 | Chen et al. | 427/250 X |
| 3,785,792 | 1/1974 | Plumat | 65/60 A |
| 3,888,649 | 6/1975 | Simhan | 427/251 X |

FOREIGN PATENT DOCUMENTS 2,424,329 12/1974 Fed. Rep. of Germany ........ 215/12 R

OTHER PUBLICATIONS

Powell et al., *Vapor Deposition,* pp. 305–307 (1966).

*Primary Examiner*—Harry J. Gwinnell
*Attorney, Agent, or Firm*—John T. Lewis

[57] ABSTRACT

A method of producing improved metal coated glassware and other brittle, non-metallic engineering materials, including items for laboratory and industry, which items are ordinarily brittle and subject to breakage or rupture under relatively low pressures and relatively minor impacts, said method utilizing an anti-bonding film, such as graphite, between the external surface of the glass, and a metal coating, which is generally chemically vapor deposited. The coated products have good impact strength, shock resistance, good heat distribution, good pressure capability, and an extremely high safety factor. Brittle fracture or rupture is a fracture unaccompanied by plastic or permanent deformation. Brittleness is that quality or property of a material that leads to crack propagation without plastic deformation.

3 Claims, 2 Drawing Figures

METHOD OF MANUFACTURING DEFECT FREE NICKEL ARMORED LABORATORY AND INDUSTRIAL BRITTLEWARE

This application is a continuation-in-part of our U.S. application, Ser. No. 568,422, filed Apr. 21, 1975, now abandoned.

BACKGROUND OF THE INVENTION

The many unique and functional properties of glass make it a most useful material, particularly for laboratory and industrial glassware and apparatus. This is especially true of the borosilicate glasses which are hard and resistant to corrosion by most chemicals. Such glasses along with quartz and high silica glasses also have low expansion coefficients and are therefore more resistant to thermal shock failures than soda lime, or other glasses with higher expansions. Borosilicate glass, like most other glass,* is highly brittle and sensitive to mechanical shock or impact. This is further magnified by the presence of the many little flaws generally present in all commercial glassware. Such flaws act as stress raisers which greatly increase the impact sensitivity and failure probability of the material. It is apparent that the brittle failure of glass makes it a hazardous material for containing chemicals and the like. Failure is frequently catastrophic, that is a light impact may not just crack a glass vessel, but actually cause it to break with the release of its contents. Laboratory accidents frequently are the results of broken glass, and glass shattering impacts, explosions and implosions. Industrial pipelines, for example, used for hot and corrosive fluids are prone to catastrophic failure by impact.

*Certain chemically treated glasses are considerably more shock resistant but nevertheless are subject to brittle failure. This is also true of glass-ceramics.

One approach to the protection of glass pipe is in the use of plastic jackets or wound tape coatings, i.e., polyester-glass fiber. This type of protection is used primarily for pipe transporting fluids, since the use of plastic does not allow the heating of glass beyond the relatively low temperature limitations of the polymeric coating. Therefore, it cannot be used for many types of glassware, both industrial and laboratory, where heating is required. The tape wrap adds nothing to the strength or intrinsic pressure capability of the glass pipe.

The literature describes metal coated glass objects such as light reflectors; flat plates for electronic circuits, and the like. We have not found reference to metal coated glassware particularly for use as laboratory ware, chemical processing applications, etc.

In all the literature examined we have noted the emphasis on glass surface preparation in order to obtain good adherence or bonding between the glass surface and metal coating. This need for good bonding is a theme common to all the literature we have seen. Several references indicate the need to leach, etch, or otherwise treat the glass surface in order to obtain the best possible adherence. This adherence requirement is in direct contradistinction to our coating technique which requires the use of anti-bonding films to consistently obtain defect-free, strengthened, glassware. This will be made clear in the following description of the invention.

What has been said hereinbefore about the shortcomings in the prior art with respect to a need for providing to glass items adequate impact resistance, improved heat distribution, adequate resistance to breakage at higher pressures, and fail-safe protection can also be said of molded graphitic items such as, for example, molded graphite and impervious (polymeric resin infiltrated) graphite tubes or pipes for heat exchangers and the like. Some of the shortcomings of conventional impervious graphite heat exchange tubes are described by Dennis G. Hills in an article in the Dec. 23, 1974 issue of Chemical Engineering, at page 83:

> The limitations on this design are the pressure limits, which are relatively low. The highest recommended operating temperature is approximately 180° C. and the operating pressure 75 psig with liquids and up to 50 psig with steam.

Heat exchange tubes made of graphite which are to be subjected to elevated pressures are made conventionally with very thick walls. Thus, for heat exchange equipment in which there is pressure inside the graphite tubes, conventional treatment requires a sacrifice of heat transfer capability due to the requisite thick tube walls. The present invention makes such sacrifice in heat transfer capability unnecessary, even though the basically graphite tubes are to be used under pressure. Also, the present invention makes it possible to use graphite tubes in equipment which involves substantially higher pressure than was heretofore believed possible without sacrificing any heat transfer capability. Using the present invention, the walls of the graphite tubes can actually be made thinner than those used in conventional graphite tube heat exchange practice, so long as the graphite remains thick enough and retains enough surface and porosity integritiy to accomplish the desired degree of corrosion prevention. Graphite pipe walls could be reduced in thickness by half or more if the pipe were nickel armored, for example, in accordance with this invention. Although graphite (including impervious graphite) has a higher thermal conductivity than nickel (975vs550), the decreased wall thickness of the pipes made possible by this invention would more than compensate, in view of the relatively thin metal coatings that are used, so that the combined thermal conductance of the thinner walled metal-coated graphite tubes or pipes would be higher than that of conventional graphite pipes. Even without changing the thickness of the carbon (or graphite) tube walls, the thin metal armor would detract very little from the thermal conductance property of the uncoated tubes.

The present invention seeks to overcome certain of the basic disadvantages of brittle objects such as glassware by providing a strong, metallic, safety armor over the outer surface of such objects. Also it seeks to improve the heat distribution, pressure capability and other properties of glassware and other brittle engineering materials, made for example, of quartz, graphite, glass-ceramics, carbon, graphite, cermets, semi-conductor materials, and the like.

SUMMARY

This invention relates to metal coated or armored safety glassware, glass-ceramics, and ceramics, particularly laboratory and industrial glassware, and an improved method of preparing such products. This invention also relates to other brittle objects such as containers and tubes and the like which are armored in accordance with the methods described herein.

This application is based on our discovery of an improved method of armoring glassware, although our earlier work demonstrated that such coated objects possessed superior impact resistance and strength. However, our earlier method was associated with a cracking of the glassware as a result of certain nonuniform stresses set up in the glassware by the strong nickel coating. This cracking was so frequent as to render the method of very limited commercial value. Our improved method has eliminated this problem thereby making our new technology entirely suitable for commercial exploitation.

An object of this invention is to produce metal armored hollow brittle objects such as glassware that are highly resistant to mechanical and thermal shock, products that will not rupture by severe impact, and that would fail-safe. Such products will have a high safety factor, enhanced strength, and durability, that can withstand higher stresses, and higher pressures without failure. Such products are composite brittle-ware products, including glassware products with a degree of reliability heretofore not achieved in such brittle-ware, making them particularly useful for industrial and laboratory applications.

Another object is to produce metal armored brittle-ware products with superior heat distribution by virtue of the high thermal conductivity of the metal armor. Such brittle-ware would allow a much more uniform heating of contents, more uniform boiling, minimizing "bumping", which frequently occurs in plain glassware. The metal armor would also level out thermal gradients, and therefore significantly improved thermal shock resistance.

A purpose of that aspect of this invention which relates to armored glassware is to provide a composite product combining the virtues of metal, i.e., toughness, strength, plasticity, with those of glass, i.e., inertness, smoothness, hardness and transparency.

Transparency in coated glassware or other transparent brittle-ware can be provided by windows with screened patterns (2 in FIG. 1) so designed and arranged as not to detract from the compressive strengthening by the metal armor. These and calibration markings, etc. can be provided by photochemical masking techniques, combined with chemical etching through the metal, or silk screening techniques with etching through the metal. Another object is to produce metal armored glassware that can be joined to other armored glassware, or to metal parts, components, etc., by soldering, brazing, or certain types of welding. This is particularly applicable to armored glass tubing and piping products where metal collars, flanges, and the like, could be joined to the metal armor. These attached metal parts could then be used to couple armored glass pipes, fittings; also tube sheets etc., in heat exchangers.

An object is also to produce metal armored glassware such as flasks, reactor vessels, piping or other forms, that can be electrically heated by virtue of the highly conductive metallic armor. This could be resistive or inductive heating.

Another object is to produce especially heavy metal armored glassware, glass ceramic ware, graphiteware, quartz ware, ceramic ware, and the like, capable of withstanding high pressures, and having very high impact strength for applications involving pressure. Such coatings would be up to 100 mils in thickness where high pressures up to 2000 psig are required, or for other high stress applications such as strong exothermic reactions.

An object, is therefore to provide metal coatings on brittle-ware such as glassware and the like, particularly nickel in the thickness range of 5 to 100 mils.

An object is to provide pressure vessels useful as reactors, and the like, consisting of a borosilicate type glass, quartz, or a high silica glass, armored with a thick nickel coating up to 100 mils, and with an anti-bonding film between the glass and metal, such as graphite, with or without screen pattern windows and characterized by good impact strength and pressure capabilities up to 2000 psig.

An object of this invention is to provide specific safety metal armored products for industrial and laboratory applications including, flasks, bottles, beakers, tubes, centrifuge ware, pipets, graduated cylinders, funnels, dessiccators, jars, bell jars for vaccum work, condensers, distilling apparatus, dewar vessels, distilling flasks, freeze dry glassware and others. Also pipe and piping accessories, heat exchanger tubes, valves, drain lines, reaction vessels, absorption columns, distillation units, evaporators and related and accessory equipment.

An object of this invention is a method of coating glassware and other brittle-ware with a protective safety metal armor which minimizes damaging stress concentration set up in the glassware (or brittle-ware) as a result of the unequal expansion coefficients of the metal and glass or other brittle ware.

Another object is to provide externally metal armored carbon and graphite products wherein the metal armor coating backs or houses the carbon or graphite objects to thereby impart to the resulting metal armored products enhanced strength and impact resistance, for applications such as bearings, seals, pump parts, rings, liners and the like.

Another object is a method of consistently producing defect free, safety metal armored glassware (and other brittle-ware) by use of a thin anti-bonding film or coating on the brittle-ware which separates the metal armor from the brittle-ware surface, preventing it from bonding to the surface of the brittle object, and thereby reducing greatly the high stress concentrations produced by the unequal contractions and expansions of the metal coating, and brittle object when the temperature of the coated object is changed.

Still another object is a method of metal armoring glassware and other brittle-ware by chemical vapor deposition, utilizing an anti-bonding film to prevent cracking or other defects from developing in the glassware and the other brittle-ware as a result of metal bonding to the glassware and other brittle-ware.

Another object is a method of metal armoring glassware and other brittle-ware by electroplating, utilizing an antibonding film to minimize stress concentrations as in chemical vapor deposition of metal, except that the compression of the brittle-ware is not as great because of the lower electro deposition temperatures.

A further object is a method of metal armoring glassware and other brittle-ware by electrodes metal (chemical) deposition or plating, utilizing an anti-bonding layer or film to minimize stress concentration which produce cracking and other defects, as in chemical vapor deposition, except the stresses set up are not as high.

Another object is a method of metal armoring glassware and other brittle-ware by combining chemical vapor deposition, and electroplating or electroless plating, or combinations of all three methods, in conjunction with the use of an anti-bonding film to minimize or prevent defects due to the high stress concentrations. For example, a glass bottle could be coated with anti-bonding film, followed by a thin coating of nickel by chemical vapor deposition followed by heavier electroplated nickel, and finally with a thin electroless coating of nickel. A variety of metals may be used in the practice of our invention including nickel, copper, silver, cobalt, chromium and combinations of these.

Another object is to define or characterize the types of anti-bonding coatings and materials best suited for use on glassware and other brittle-ware in conjunction with the metal armor and methods of armoring employed. These coatings are finely divided particulate materials applied by spraying to thicknesses generally not in excess of 10 microns, characterized by physical and thermal stability under the various conditions of metal armoring, and also under conditions of usage. Certain stable polymer films may also be used as anti-bonding coatings.

Of prime importance in the practice of the improved method of this invention is the surface preparation of the glass or other brittle-ware object to be metal coated. This is a key factor that forms the basis of the novelty of our improved method of armoring glassware. Conventional coating technology teaches methods of surface preparation in order to obtain maximum adherence of the coating to the substrate. This includes methods of cleaning the surface, the use of primers, flash coatings, and heat treatments as well as mechanical means such as etching, grit blasting, and other methods of obtaining a roughened surface to promote mechanical interlock and thus adherence. This mechanical interlock is particularly important in the case of dissimilar materials where chemical or metallurgical bonding is not feasible, i.e., bonding of metal to glass or ceramics.

Our improved method teaches just the opposite to that of conventional coating technology concerning the bonding of coating to substrate as it pertains to a metal coating of substantial thickness, to glassware or other brittle-ware, of a geometry used as containers, vessels, piping, etc., as described in the invention.

For the sake of convenience and simplification, in the following portions of the general description of this invention the brittle material treated in accordance with the process of the present invention will be referred to as "glass" or "glassware", although it should be understood that other brittle materials, containers, tubes or other shaped objects can be treated in the same manner. For example, the word "glass" in the following general description can be replaced with "quartz", graphite, carbon, cermets, ceramics, semi-conductor material, glass-ceramic, or any other like brittle engineering material, as desired.

The utility of this invention is apparent if we consider the problems and dangers of glass breakage both in the laboratory and industry. It is further evident that over the years no really effective solution to this problem came into being. This invention is therefore a significant contribution to the art of producing a metal-strengthened glassware with a high safety factor, with far greater reliability and reproducibility of properties then ordinary glassware. In a sense it is a new composite material that will enable chemical engineers and the like, to design processing systems with enhanced capabilities of strength and safety.

From a functional point of view is the fact that glass is greatly strengthened by this metal coating. This means that higher working pressures can now be used in reactor vessels, pipe, and other equipment. It also means that the wall thicknesses of brittle pipes, tubes and vessels and other brittle equipment can be reduced even though the piece of equipment is to be used in situations involving relatively high internal pressures. It also means that larger vessels, etc., which are generally limited to lower working pressures than comparable small vessels can now be used at much higher stresses*. This strengthening effect is further illustrated by a high speed centrifuge test of an uncoated glass tube and one coated with 0.003 in. of nickel. The uncoated borosilicate glass centrifuge tube failed below 8000g (completely pulverized) whereas the coated tube was undamaged after enduring 50,000g.

*A 5 liter glass spherical vessel, borosilicate glass, is rated at a maximum working pressure of 15 psig, whereas a 200 liter vessel is limited to a maximum working pressure of 3 psig.

Metal coated glass, as previously mentioned, is stronger, tougher, more impact resistant than plain or uncoated glass. The composite is also shatterproof and does not rupture even if the glass is badly cracked or broken. The mechanism of such effects may be explained by the following considerations:

1. The metal coating strengthens the glass by exerting a compressive force. (This holds for a glass form coated on its external or outer surface.) The state of compression is accomplished by coating at an elevated temperature, in the case of nickel by vapor deposition, 200° to 550° F. Since the coefficient of thermal expansion of nickel (7.7 in $10^{-6}$ in./in./° F.) is about four times higher than borosilicate glass (1.8 in $10^{-6}$ in./in./° F.) and the modulus of elasticity about three times higher, the glass is strongly compressed on cooling to room temperature. This compressive force adds to the strength of the glass itself, since glass always fails in tension. In the case of an aluminum metal coating the coefficient of themal expansion would be 7½ times greater when cooled from the plating** temperature of 750° F. The elastic modulus is about equal to that of the glass. An electrodeposited nickel coating applied from a sulfamate bath, for example, would be compressed to a much smaller degree since the coating bath temperature is about 120° F. Glassware coated with a nicel-phosphorous alloy, from an electroless nickel bath generally operated at about 200° F., would compress the glassware more than the electrolytic sulfamate nickel bath but still considerably below that of the gas plated nickel. An electroless nickel-boron plating bath has also been used. Such baths operate at between 120°-160° F. and so would be intermediate between the nickel-phosphorous and nickel sulfamate coatings in compression to the glassware. Electroless Ni is considerably harder than either gas plated or electrolytic sulfamate nickel, but also much more brittle and less tough, and shock resistant. Combination of gas plated nickel, and electrolytic, or electroless or all three have been used to coat glassware. Also the coating of glassware with appropriate metal sensitizers, or conductive film, has been done without gas plated nickel, although gas plating is generally the preferred method.

**Vapor deposition of diethyl aluminum hydride.

2. The metal coating also provides increased impact and shock resistance to the glass object because the metal itself absorbs energy by deformation in the case of ductile metals like nickel and aluminum.

3. Still another advantage of the armored glassware is the protection of the outer surface from scratches, abrasions, etc. This is particularly important since the slightest defect will render a glass vessel unsafe to use.

Metal armored glassware may be distinguished from other coated glassware by the characteristic manner in which it fractures. For example, if a nickel armored vessel is hit with a sufficiently hard blow it will fracture generally at the point of impact with the fractured glass converted to a fine powder. This type of fracture is a result of the strong state of compression of the glass produced by the metal armor. By comparison glassware not under such strong compression as those made by this invention will fracture by the fragmentation of the glass into relatively large multisized pieces. The compressive fracture is much safer mode of failure since the fine glass powder particles have extremely low kinetic energy as compared to the sharp, jagged, larger glass pieces which result from the fracture of ordinary glassware. Like shrapnel these larger flying glass particles would be highly dangerous.

Other brittle materials under strong compression behave in a similar manner. On the other hand the vessel coated by the method of Outer bridge (U.S. Pat. No. 514,426), when fractured, did not produce powdered particles of glass but produced relatively large pieces of glass fragments of different sizes. Metal armored graphite like armored glass, also exhibits a fracture mode similar to our metal armored glass under compression.

DESCRIPTION OF INVENTION

Figure 1:
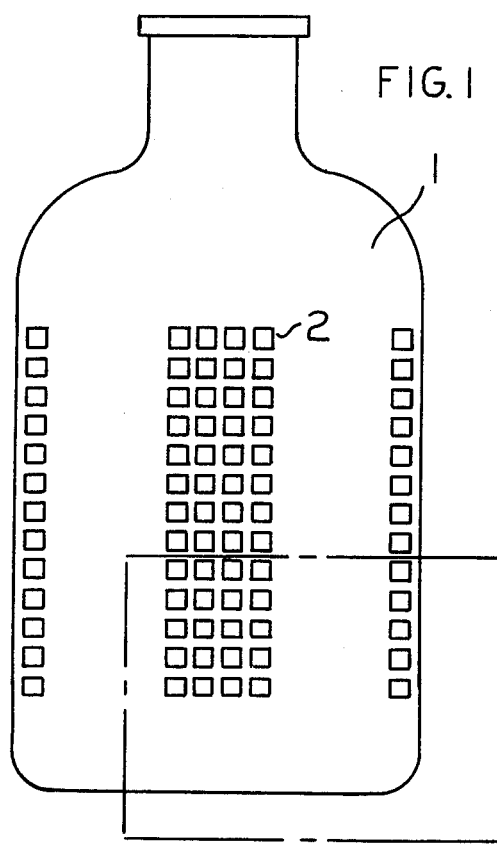
FIG. 1 illustrates a metal armored glass vessel showing a full center window and part of two other windows.
Figure 2:
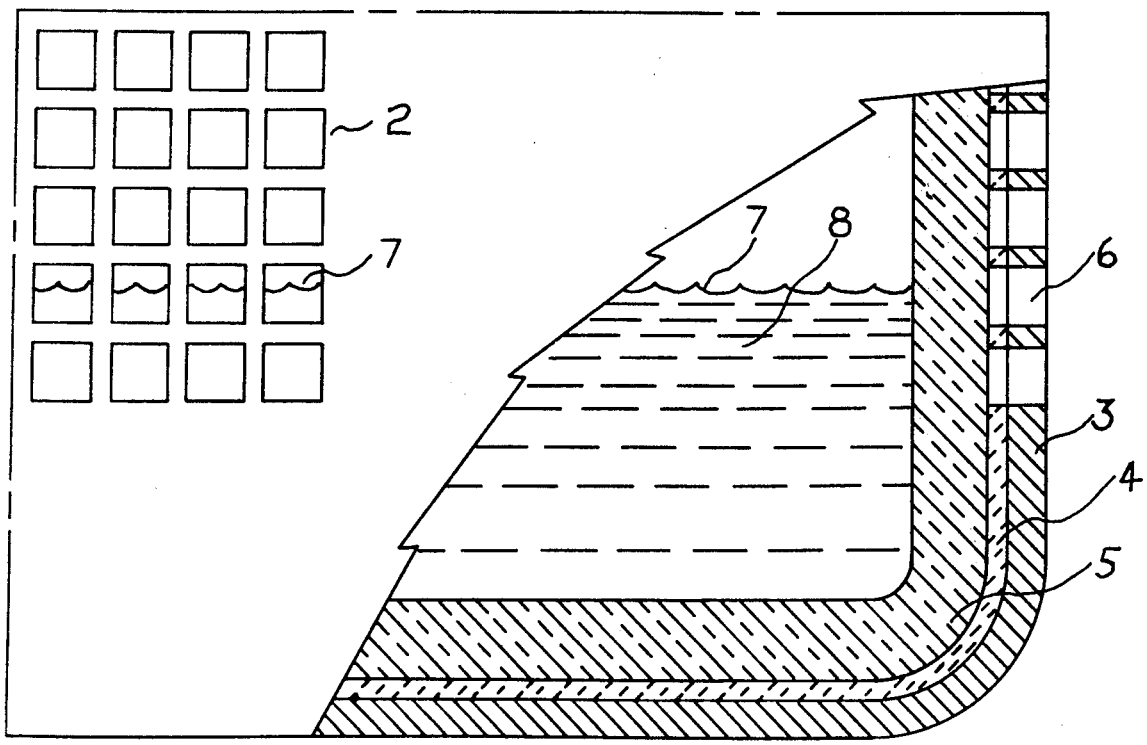
FIG. 2 illustrates an enlarged portion of the vessel shown in FIG. 1, showing detailed structure of the coating, the anti-bonding layer and the vessel wall.

In FIG. 1, which illustrates a vessel armored in accordance with this invention, 1 is the vessel coated with metal and 2 designate a window through the metal coating. In FIG. 2, 3 is the metal armor layer or coating, 4 is an anti-bonding layer or film, 6 is the vessel wall, 7 is the liquid level visible through a window 2, and 8 is the liquid in the transport vessel.

The improved method of the invention is based on the use of a thin film coating applied to the surface of the glassware, which separates the outer metallic armor from direct contact with the glass surface. (FIG. 1 & 2). This film may be described as an anti-bonding film since it prevents bonding or adherence of the metal to the glass surface, particularly to defects, including those of microscopic size, which generally exist on the surface of commercial glass. Such defects may be pits, scratches, abrasions, roughened areas, also intentional insignia etch marks and graduation marks frequently used on laboratory and process glassware, where the depositing metal can penetrate and mechanically interlock or bond. Since the metal coating is applied at elevated temperature, and since the expansion coefficient of nickel for example is 4 times greater than borosilicate glass, a high contraction of the nickel will occur upon cooling. If during this contraction process the nickel coating cannot freely move because it is strongly adherent to the glass surface, or mechanically locked to pits etc., high stress concentrations may develop which can easily cause cracking or fracture of the glassware. It is the function of the intermediate anti-bonding film to allow the metal to freely contract and conform to the geometry of the glassware on cooling, whereupon it forms a tight shrinkfit to the glassware which is placed in strong compression. The fact that this film prevents adherence can be easily demonstrated by cutting the nickel and peeling it, whereupon it easily and without resistance separates from the glassware. Nickel coated glassware without this thin anti-bonding film will also separate quite easily from smooth portions of glassware but will frequently strongly adhere to pits, etch marks, roughed areas frosted glass, and defects in general. This adherence can be strong enough to cause the glass to crack or break, indicating that mechanical interlock does occur. It is also known that clean, dry glass, as the glass must be before coating, has a relatively high coefficient of friction. Compared to a glass surface with adsorbed films of moisture, oils and other contaminants. The high friction of such a clean glass surface may also impede the contraction of nickel upon cooling from the coating temperature, which may also contribute to high stress concentrations. The preferred anti-bonding films, however, have a relatively low coefficient of friction, which allows the metal coating to freely contract.

For maximum effectiveness the anti-bonding film should have a combination of the following properties and characteristics. Application characteristics: The anti-bonding film should completely cover the glassware surface including all pits, scratches, micro defects, roughened areas, or all anchor points, that would allow the depositing metal to directly contact the glass surface, or penetrate to the glass surface because of defects or discontinuities in the film.

The anti-bonding film itself by virtue of its intrinsic strength, thickness, adhesiveness, or flexibility, should not exert high differential stresses on the glassware. This is quite possible in the case of certain polymers, like the epoxies, characterized by high strength and high adherence. We have found that it is not uncommon for glassware to crack with only an epoxy coating. A strong, highly adhesive, plastic coating because of its high coefficient of expansion relative to glass, can therefore set up high differential stresses, particularly when it fills in surface defects in the glassware.

The anti-bonding material should be applied by a method that gives a uniform coating. We prefer to apply the film by a spray technique since a uniform film is easily obtained this way providing of course, that the coating material is properly prepared and applied. Other methods such as dipping and painting are satisfactory if they give a uniform coating.

Thermal Stability: This is particularly important when coating by chemical vapor deposition, since any decomposition, gasing, or volatilization would inhibit metal deposition. A stability in the range of 400°–500° or above, is desirable.

Low friction and non-sticking: It is important that the metal coating should not be strongly bonded to the intermediate anti-bonding film, where such films are tightly adherent to the glass surface. In other words the intermediate film should not act as a cementing layer. This would, as previously mentioned, set up high stresses due to the diffential thermal expansions. In cases where the film is bonded to the glass surface, but not to the metal coating, the metal is free to move, so that high stresses are not set-up, particularly if the intermediate film has a low coefficient of friction. Graphite and Teflon films are good examples of this. A low friction film is also desirable where it is more strongly bonded to the metal coating than to the glass surface.

This again allows the metal coating to more freely move on expansion and contraction. In cases where a loosely bonded film with low cohesive strength is used, the film may stick to both the metal and glass, since it pulls itself apart. This film therefore allows free movement of the metal coating. Graphite, molybdenum disulphide and teflon dispersion coatings are good examples of this.

Thermal Conductivity: Since many experimental and commercial applications of metal armored glassware involved heating and cooling, it is desirable that the intermediate anti-bonding film have good thermal conductivity. Graphite is an example of such film with good thermal conductivity whereas, polymer films such as the teflons and silicones have low thermal conductivity. The thickness of such films especially the polymers is also directly related to thermal conductivity. On the other hand thicker polymer films add to the impact strength of the metal armored glassware.

Types of anti-bonding films: These films may be broadly grouped in the following categories: (1) *Dispersion Types* where fine solid particles, generally colloidal, are suspended in a vehicle that is completely volatilized, leaving the particles lightly bonded to the glass surface. (2) *Dispersions* where the particles are suspended in vehicle composed of a polymer dissolved in a solvent. After curing, the film consists of a plastic matrix with a dispersion of the fine solid particles, or reaction products. This type of film is generally well bonded to the glass surface. The dispersion particles in types (1) & (2) may be graphite, molybdenum disulfide, etc., for low friction and improved thermal conductivity, and/or metal particles like aluminum or silver for improved thermal conductivity, electrical conductivity, enhanced inner vessel reflectivity where this is desired. A black coating of course would not be reflective to the inside of a glass vessel. (3) *Polymer Films*, generally composed of a plastic or resin with low viscosity for spraying, or that can be thinned in suitable solvent, are coated on the glass surface and cured. These films are usually well bonded to the glass. (4) *Emulsion Types*, are like the suspensions except the dispersion is composed of colloidal liquid droplets usually a polymeric material. These also may be strongly or weakly adherent to the glass surface depending upon whether or not they are resin bonded.

We prefer to use anti-bonding films of the type (1) group, specifically dispersions of colloidal graphite, molybdenum disulfide, fluorocarbons, in vehicles that are easily applied by spraying techniques. The liquid should have a rather fast evaporation rate, i.e., isopropyl alcohol, freon, etc. These particulate films are not only easy to apply but are easily removed, if required (for example where windows will be placed) economical, require no cure (only drying or a bake, to thoroughly remove liquid.) They have good thermal conductivity, some electrical conductivity like graphite, good lubricity, (low friction) and high thermal stability, particularly the graphite and molybdenum disulfide. These films are usually applied to the thickness range of 1 to 25 microns (usually about 2–10 microns). Good anti-bonding films that may be classified as type (2) where fluorocarbon resins and suitable modifiers are dispersion in solvents. These coatings require curing at elevated temperatures (600°–800° F.).

They have a moderate bond strength to the glass surface and a low friction surface. These fluorocarbons are excellent but consideraly more expensive than the type (1) coatings for both materials and processing costs. Type (3): We have found that certain silicone polymers, known as silicone insulating varnishes, have desirable properties as anti-bonding films, including good thermal stability, low friction, and good flexibility. They have a stronger bond to the glass surface than do the fluorocarbons, but we have not noticed glass cracking. However, like the fluorocarbons these resins are relatively expensive and require extended cures. Type (4): Silicone resins dispersed as emulsions of the 'oil in water' type, G.E. - sm 2100, also function as anti-bonding coatings but offer no particular advantage over those already mentioned and are considerly more expensive.

In practice the coating is applied by gas plating, otherwise known as chemical vapor deposition. It is a preferred method since it can be applied at an elevated temperature, and strongly compresses the glass object upon cooling. This, as previously mentioned, exerts a strengthening effect on the object.

Coating with nickel from this compound, nickel tetra carbonyl, is particularly versatile since deposition can easily be accomplished between 350°–550° F. or from 150° to 550° F. with the use of catalysts. Gas plating nickel from bis carbonyl is well known, although the strengthening effect on glassware by this coating method is not really too obvious. To the best of our knowledge it has not been done before.

Aluminum coating is another good method particularly from the compound diethyl aluminum hydride. A deposition temperature of about 750° F. is used. Of the two metals, nickel is probably the best because of its superior corrosion resistance, and ease of application.

The method of gas plating is as follows: The object, to be coated is placed in an air tight chamber, and purged of air with an inert gas, the object such as a glass flask, is then heated by a resistance heater, placed inside it, and controlled by a variac. The object may also be heated by a fluid such as heat exchange fluid which is piped to it and circulates within its interior. It may also be heated externally by an infra red lamp or other exterior radiating heat source. In this case the sides of the chamber are transparent. When the object, reaches the desired coating temperature the coating compound (i.e., nickel carbonyl) in the form of a fluid is metered through a Flowmeter to a vaporizer, which converts it to a vapor. The vapor is blended with carrier gas, metered through a flowmeter and flows to the plating chamber where it impinges on the heated object. The compound then thermally dissociates into a metal and a gas. In the case of nickel carbonyl it decomposes to Ni and carbon monoxide as shown by the following chemical reaction:

$$Ni(CO)_4 \rightarrow Ni + 4CO$$

The nickel is deposited as a dense, continuous coating and the carbon monoxide is exhausted and burned or collected.

The nickel is contained in a pressurized cylinder, and metered to the vaporizer through a flowmeter, the inert purging gas is metered through a flowmeter. The coating in the case of nickel may be of any desired thickness, depending upon the application, ranging from less than 5 mils to 100 mils or more. A preferred range found suitable for most applications, is from 5 mils to 20 mils. For the benefits that can be derived by practicing that preferred aspect of this invention relating to how objects such as containers, reactors, tubing, rings and the like, substantially the entire outer surface of the glass (brittle-ware) object should be covered with the metal (armor) coating, with the exception of the "windows" (when they are desired for observation of the contents of the coated container for example) through the metal armor as described hereinbefore.

After the object is coated to the desired thickness, the chamber is purged with inert gas and the object removed. Appropriate measures must be taken with nickel carbonyl since it is toxic. The plating chamber is therefore enclosed in a suitable ventilated hood and the exhaust gas rendered harmless by passing through a burner. The gases may also be collected and stored in cyclinders. In this manner there is no contamination of the environment.

EXAMPLE 1

Six 500 ml borosilicate glass centrifuge bottles. Corning No. 1280, were carefully inspected for freedom from scratches and other defects that would render them unsafe for normal use. These bottles are also used under pressure in shaker type hydrogenation apparatus, with a working pressure not to exceed 50 to 60 psig. In this example we are concerned with their use as pressure vessels, which means that each bottle will be hydrostatically pressure tested before use.

The bottles were cleaned by washing in an alkaline type detergent (alconox) thoroughly rinsed in water, and forced air dried with filtered compressed air. Three of the bottles were then uniformly sprayed with a colloidal graphite suspension to a thickness of about 1–3 microns. The material was a 1 part graphite concentrate to 10 parts isopropyl aochol dilution for spraying at 50 pounds air pressure of filtered air, contained in a conventional paint spray apparatus with a fine spray nozzle. The graphite is commercially available from Acheson Colloids Company as product No. 154. Both the three graphite coated and the three uncoated bottles were baked at 500° F. to thoroughly dry and remove all volatiles. The bottles were then mounted on appropriate stands, upside down, and placed in the plating chamber; (previously described) the bottles were coated with nickel to a thickness of ten mils, by chemical vapor deposition, also known as gas plating, the coating temperature was 450° F., for a time of 1 hour. The bottles were allowed to cool in the chamber as it was purged first with nitrogen, followed by air. After removal from the chamber the bottles were inspected for cracks, and chips. It was found that one of the uncoated bottles had a crack at the bottom curvature radius and at the shoulder as it narrows to form the neck. The bottles were allowed to stand several days since cracks frequently take time to appear, sometimes a week or longer. Upon further inspection cracking was found in another of the 2 remaining uncoated bottles, again in the bottle radius, and neck rim. The three bottles coated with the anti-bonding graphite film were completely free of cracks, as well as the one without graphite. Visibility ports or windows were then placed on the four good bottles, two in each bottle, opposite each other in order to see inside. The windows were one inch wide by 3.5 inches long with a screen pattern that combines adequate visibility without much sacrifice in strength. The windows were made by a silk screening technique, using a chemical resist ink to obtain the screen pattern. The pattern coated nickel armored bottles were then etched with ferric chloride to produce the required screen windows.

Both the silk screen and etching techniques are well known arts, although our application is armored glassware is new insofar as we know. With the windows in the pressure bottles, the armored product was now typical of a vessel that would be used practically in the field. They were then tested as follows:

Hydrostatic Pressure Test: The bottle is closed with a one hole rubber stopper No. 6, thru which a ¼ inch copper tube enters the bottle. It was placed between two platens which hold the bottle and secure the stopper while hydrostatic fluid (Prestone) is pumped into the bottle thru the copper tube to a pressure of 300 psig. It is held under pressure for 5 minutes. We have observed that the slightest micro cracks not visible to the eye, are opened up under a pressure of about 50 psig.

The three nickel armored bottles with the graphite anti-bonding film and the one bottle without the graphite film, were tested in this manner. The bottle without the graphite failed at 45 psig. indicating that a micro crack not visible to the dye had opened under this pressure, whereas the three bottles with the intermediate graphite film successfully passed the 300 psig hydrostatic test without evidence of cracks. The uncoated glass bottles, also known as 'Parr' bottles, and sold by the Parr Company and many scientific laboratory supply companies, are rated for 60 psig of hydrostatic pressure.

Gas Pressure Test: Since this type of bottle is frequently used for hydrogenations and other gas reactions under pressure, it is important that the bottle be strong enough to withstand such pressures, since a serious glass shattering explosion could occur. Such bottles are rated at a relatively low pressure (i.e., 60 psig) because of the unpredictable strength of glass which varies within wide limits due to surface imperfections. Furthermore, abrasion and scratching of the surface greatly lower this value or make it totally unsuitable and dangerous for pressure reactions. This results in both safety hazards and an economic disadvantage.

The gas pressure test is much like the hydrostatic test except that a high pressure nitrogen gas cylinder is used in place of the hydrostatic fluid and pumping system. By means of a gas regulator the bottles are pressurized to the value, in this case 200 psig. The bottle is now impacted on the window area with a ½ pound steel ball dropped from a sufficient height to crack the glass. (The impact strength value, average 40 inch pounds, was previously obtained and described below.) in the case of these bottles it was found that a 50 inch pound force cracked the glass under a metal armor about 10 to 11 mils (0.010–0.011 inches) thick. This test is used not only to determine the pressure capability of the metal armored bottle but also the mode of failure. This is highly important since the sudden release of gas pressure could produce a 'blow-out' (explosion). Plain glass bottles when pressurized at only 50 psig are blown to bits when impacted with a force of less than 5 inch pounds.

The three metal armored bottles with the anti-bonding graphite film were tested in this manner. (Nickel coating was an average of 10 mils thick) the results are shown below:

| Bottle Size | Coating Thickness | Impact in. lbs. | Nitrogen Gas Pressure | Remarks |
|---|---|---|---|---|
| 500 ml | 0.0100 in. | 50 | 200 psig | Cracked* |
| 500 ml | 0.0105 in. | 50 | 200 psig | Cracked* |
| 500 ml | 0.0110 in. | 55 | 200 psig | Cracked* |

-continued

| Bottle Size | Coating Thickness | Impact in. lbs. | Nitrogen Gas Pressure | Remarks |
|---|---|---|---|---|
| 500 ml | plain glass | 5 | 50 psig | Shattered |

*Glass under window fractured at point of impact with ball. The glass was contained within the bottle, gas escaped slowly, no blowout, failed safe.

It should be noted that impacts with armored glassware great enough to produce fracture, are of a ballistic nature that is like a bullet impact where a small round hole or cracked area is produced with the rest of the glassware intact except for some radiating fine cracks from the point of impact. Thus the glassware maintains its form. The fractured glass produces powdered particles because it is under strong compression, as opposed to the varying size fragments and chucks of uncoated glassware when it was fractured.

After the test the cracked glassware was filled with water and it was noted that the leaks were small and slow indicating that in actual use there would be time to transfer fluid contents to another vessel. In cases where the fracture was not on a window areas, there would be little chance for a leak, since the nickel armor would still be intact. The fluid contents could then be transferred without loss.

EXAMPLE 2

Siz 1000 borosilicate glass bottles called reagent bottles, plain, narrow mouth, without stoppers Corning Cat. #1460, were carefully inspected for defects that would render them unsafe as pressure bottles. The bottles were thoroughly cleaned, as in example 1, and sprayed with molybdenum disulfide to form a film 3–5 microns thick. The material was a colloidal suspension of molybdenum disulfide in isopropanol, product No. 210 Acheson Colloids Company. It was sprayed with the paint sprayer described in example 1. Both the three coated with molybdenum disulphide and the three uncoated were processed as previously described in example 1 and gas plated with 10–12 mils of nickel (previously described) at 450° F. for 65 minutes. After cooling in the plating chamber overnight the bottles were removed and it was found that one of the uncoated bottles had developed a crack on the sidewall near the bottom. The 5 others appeared free of defects and were hydrostatically tested as described in example 1, with the following results:

| Bottle No. | Hydrostatic Pressure psig | Results |
|---|---|---|
| 1-Under coated | 150 | O.K. |
| 2-Under coated | 150 | O.K. |
| 3-Under coated | 150 | O.K. |
| 4-no undercoat* | 20 | crack developed |
| 5-no undercoat* | 35 | crack developed |

*The two remaining bottles that were not undercoated with an anti-bonding film of molybdenum disulphide had developed cracks or had micro cracks that opened up at the pressures indicated, and they failed.

EXAMPLE 3

Four 5000 ml round bottom, three neck distilling flasks, cat. No. L.G.-7330 (Lab Glass Inc.) were carefully inspected for defects that would render them unsafe for use. The flasks were prepared for an anti-bonding under coat and gas plating, with nickel, as described in example 1, except that two of the flasks were not undercoated with the anti-bonding film. In this example two of the flasks were sprayed with a fluorocarbon material, to a thickness of 2–5 microns. The fluorocarbon is suspended in a fluorocarbon propellant (freon) that is prepared as a regular aerosol spray can, (Product # MS-122 Miller-Stephenson Chemical Company.)

The flasks were gas plated (as described previously) at a temperature of 450° F., for 45 minutes to give a nickel coated thickness of 7.5 mils. After removal from the gas plating chamber it was found that both flasks that did not have the fluorocarbon under coating, were cracked, one at the equator of the flask, the other where one of the side necks joined the spherical area of the flask. The two flasks coated with the anti-bonding fluorocarbon were perfectly free of cracks and tested for impact strength along with 2 plain uncoated glass flasks of the same size and type. The results are shown below

| Flasks | Impact Strength in.lbs. | Remarks |
|---|---|---|
| Coated Flask #1 | 25.0 | O.K. |
| Coated Flask #2 | 25.0 | O.K. |
| Plain Glass Flask #1 | Less than 5.0 | shattered |
| Plain Glass Flask #2 | Less thnan 5.0 | shattered |

The tests were made by dropping a half pound steel ball from a measured height on each flask, at the 'equator' area of the spherical surface.

EXAMPLE 4

Four, two liter round bottom boiling flasks, Corning No. 4320, were carefully inspected for defects that would render them unsafe for use. They were thoroughly cleaned in preparation for undercoating, and nickel coating by gas plating (Chemical Vapor Deposition) as described in example 1. Two of the flasks were undercoated and two were not. The anti-bonding undercoating used was a fluorocarbon resin and modifiers dispersed in organic solvents. (Product of DuPont Company, known as Teflon finish No. 959-203) the undercoat was cured by placing in an oven and bringing flasks up to temperature of 300° F. for 15 minutes, followed by 15 minutes at temperature of 650° F. The flasks were allowed to cool and removed from oven, placed in the gas plating chamber, heated to a temperature of 450° F. by means of heat exchange fluid pumped through the interior of the flask (heating fluid used was product 50 HB 280X, Union Carbide Corp.) and plated for 50 minutes to a coating thickness of 8.0 mils. Two of the nickel coated flasks were not previously undercoated. The four nickel coated flasks, two with an undercoat and two without, were allowed to cool overnight in the plating chamber. Upon removal it was found that the two undercoated flasks were free of discernible cracks or defects, whereas one of the flasks without the intermediate flurocarbon film, had a crack near the rim of the neck opening. The other later developed a crack near the bottom upon heating water in it.

The two remaining, sound, nickel coated flasks along with two similar glass flasks uncoated, were filled half full of water and placed on electric heating mantles used for heating round bottom flasks of this type and size (Fisher Scientific, Cat.#11-471-5D p. 316) the mantles surrounded the flasks about to the 'equator'. The water in the flasks was heated to the boiling point in order to observe the mode of bubble formation. It was observed that the boiling in the coated flasks was smooth and uniform with relatively small bubble formation. There was no 'bumping' as frequently occurs in plain glass vessels, without the use of boiling beads, the uncoated flasks boiled in a much rougher manner with larger non-uniform bubbles and some bumping. The more uniform heat distribution afforded by the nickel armor on the two flasks was quite apparent in this boiling experiment.

EXAMPLE 5

Four 1000 ml beakers, Corning No. 1003, Griffin, heavy duty graduated, were carefully inspected for defects that would render them unsafe for use. They were prepared and coated with ten mils of nickel in accordance with example 1, except that two were undercoated with a silicone resin, General Electric Product SR 32 known for its excellent flexibility, was thinned with the solvent Toluene to a 50/50 dilution, appropriate for spraying. The coated beakers were allowed to air dry to remove part of the solvent the rest removed by an oven bake at 100° C. (212° F.) for 10 minutes, followed by further oven drying at 190° C. (374° F.) for 10 minutes. The film, approximately 10 microns thick, was cured at 230° C. (446° F.) for 15 minutes.

It should be pointed out that beakers are good test pieces for evaluating the effectiveness of the various anti-bonding films, since its geometry with the wide open cylindrical end, is easily stressed non-uniformly. In most cases, unless the beakers are virtually perfect, and without insignia, markings, graduations, etc., cracks will develop at such locations or at scratches and most other defects.

An examination of the four beakers revealed that the two nickel coated, without the silicone anti-bonding film, were cracked. One just below the pouring spout, the other on the small frosted area used for marking the beaker. The two with the silicone film were not cracked. Further thermal shock tests verified that small defects not detected by visual observation were absent since they would have opened up. The tests consisted of alternate immersion in boiling water and ice water, for ten cycles.

EXAMPLE 6

Four solution bottles of 5 gallon capacity, also known as carboys, Corning #1595 were carefully inspected for defects that would render them unsafe for use. They were prepared as in example 1, and nickel plated as in example 4, with a Polyalkylene Glycol, Union Carbide Product 50 HB 280X, heat exchange fluid, for 1 hour at 450° F., to give a coating thickness of 10 mils (0.010 inches). Before nickel coating two of the carboys were undercoated with an anti-bond film of talc, about 7 microns thick. The talc, a product of R. T. Vanderbilt Co. N.Y., 'Nytal'-400 superfine grade, was prepared as a spray suspended in isopropyl alcohol. The bottles sprayed with a talc film were air dried and then baked for 1 hour at 500° F. to remove volatiles. The uncoated (talc) bottle were also baked at this temperature. Upon removal from the plating chamber the nickel coated vessels were inspected for cracks or breaks. No visible cracks were found in both undercoated, and those without the talc anti-bond film. The interior of the bottles had good light reflectivity because of the white undercoat in the case of the talc undercoated bottles, but not as good as the non-undercoated bottles with the mirro nickel from the inside. Good light reflectivity is also characteristic of the transparent anti-bonding films as in example 3, and 5.

The four bottle were tested for defects by subjecting them to a vacuum, since such type of glass bottles are frequently used as 'receivers' for distillates under vacuum. Therefore, the carboys were cycled from atmospheric pressure to a pressure of 2 millitorr for a total of 10 cycles. During this testing it was found that one of the bottles without the undercoat failed after the first cycle, the other after 4 cycles. Cracks developed in both these bottles, indicating undetected micro cracks before testing. The two bottles with the anti-bonding talc survived the ten cycles without any signs of defects.

EXAMPLE 7

Glass pipe, with flanged or flared ends for coupling, is extensively used in pharmaceutical industries for purity of product, and in other chemical processing areas, to convey corrosive acids, and other chemicals. The pipes are subject to failure by impact and thermal shock, also to failure at ends where pipes are coupled.

Two conical flanged process pipes (Corning) 3 inch diameter by 3 feet long were prepared as in example 1, and nickel coated as in example 4, utilizing a Polyalkylene Glycol heating fluid, to heat pipes to 450° F. for 1 hour, to give nickel coating thickness of 10 mils. The pipes were sealed at one end, an inlet and outlet pipes were attached and sealed to the other end. The heated fluid was circulated through the pipes to maintain the required temperature (450° F.). Before nickel coating one of the pipes was undercoated with graphite as in example 1, and the other not coated.

After removal from the plating chamber the pipes were inspected and found to be free of defects. They were then thermal shock tested by heating to 350° F. and plunged into ice water. This was repeated for 10 cycles, and after each cycle the pipes were examined for cracks or breaks. In the case of the pipe without the anti-bonding graphite film, cracks were detected in the heavy conical flanged end of the pipe after 3 cycles, whereas the pipe with the graphite film survived the ten cycles without any detectable cracks.

EXAMPLE 8

Four 500 ml bottles custom fabricated from heavy wall borosilicate glass tubing, with round bottoms and conical flanged openings 1 inch in diameter, were carefully inspected and then prepared for nickel coating as in example 1, and gas plated, as in example 4 with 100 mils (0.10 inches) of nickel. Two of the bottles were undercoated with an anti-bonding graphite film sprayed from an aerosol can with a freon propellant. The other two were not undercoated. The four coated bottles were hydrostatically pressure tested at pressures up to 2000 psig. The two bottles with the graphite undercoat, and one without, withstood pressures up to 2000 psig, whereas the other bottle without the anti-bonding graphite film failed at 800 psig with the development of a crack.

EXAMPLE 9

Two Quartz rectangular cells 1.5 inches wide by 0.5 inches deep, by 8 inches long, and a wall thickness of 0.05 inches, were prepared as in example 1 and gas plated (C.V.D.) in a 'teflon FEP' windowed plating chamber, and heated by linear quartz tube tungsten infra-red heaters mounted in panel reflectors. The cells were closed at the bottom and connected by a graded glass seal to a borosilicate glass tube, which in turn was coupled to a soxhlet extraction apparatus. This apparatus is used in neutron bombardment to produce radioactive isotopes. The quartz cells were prepared and undercoated with an anti-bonding film of colloidal graphite sprayed as in example 1, and coated with 5 mils of nickel, vapor deposited. One of these fragile cells cracked after removal from the chamber. Upon examination it was discovered that the graphite film did not completely cover the cell at the location of the cracked area. The other cell was free of defects. The nickel was then overcoated with an electroplate of gold 0.0001 inch for corrosion protection.

EXAMPLE 10

Four 500 ml Kjeldahl flask were inspected for defects. Two were sprayed with an anti-bonding film of graphite and the other two were not. The four flasks were than prepared for electroless nickel plating. This was accomplished by immersion of the flasks in stannous chloride solution 70 grams per liter containing 40 ml of hydrochloric acid, at 80° F., for one minute. They were rinsed and placed in a 0.1 gram per liter palladium chloride solution, containing 1 ml per liter of hydrochloric acid. These flasks were rinsed and placed in a Shipley electroless nickel bath at 190° F. They were coated with 3 mils of nickel, and removed for inspection. Three of the flasks appeared defect free, the fourth without the graphite undercoat was cracked at the bottom. The three good flasks were then electroplated in a nickel sulfamate bath at 140° F., at 100 amps per square foot, to an added thickness of 7 mils. Upon inspection the one remaining flask, without the graphite undercoat, developed a crack at the neck radius.

EXAMPLE 11

Six 50 ml round bottom borosilicate centrifuge tubes were gas plated with 0.5 mils of nickel. Three had previously been sprayed with an anti-bonding film of molybdenum disulfide, the others were not. They were all placed in a nickel sulfamate bath and coated with 8 mils of nickel. This was followed by an electroless nickel bath which added 2 more mils for a total of 10 mils. On testing the tubes in a centrifuge (Sorvall RC2B) it was found that the tubes with the anti-bonding film withstood full force of about 50,000g, whereas the 3 without the film developed cracks at 20,000, 28,000, and 39,000g respectively. This indicates that the intermediate film gave more consistent test results.

EXAMPLE 12

Three 50 ml centrifuge tubes, were prepared and coated with electroless nickel over a graphite anti-bonding film as in example 10, and coated to a thickness of 0.5 mils. Three others were treated in the same way except they were not undercoated with the graphite film, but prepared for electroless plating as in example 10, for samples without graphite. All six were then electroplated with copper (acid bath) to a thickness of 5 mils, followed by a chromium electroplate of 0.0001 mils. They were then tested as in Example 11. The three graphite film undercoated tubes failed at 25,000 g, 24,000 g, and 25,250 g respectively showing a consistent test value and indicating the reliable nature of the product, whereas the tubes without the graphite anti-bonding film failed at 22,000 g, 12,000 g, and 7500 g respectively.

EXAMPLE 13

Four 2000 ml bottles customed fabricated as in Example 8, except for 2 in. conical openings, were coated as in Example 8, except the nickel coating 2 as 50 mils thick. They were tested as in Example 8. The two pressure bottles with the graphite anti-bonding undercoat withstood pressures up to 750 psig, whereas 1 bottle without the graphite film failed at 200 psig, and the other developed a crack after nickel coating. Impact tests on the bottle with the graphite film domonstrated that these bottles survived 200 in. lbs. whereas the bottle without the graphite film failed at 70 in. lbs. Two uncoated plain glass bottles were also tested, they both shattered below 10 in. lbs.

PRIOR ART COMPARISON

Two 500 ml borosilicate glass centrifuge bottles were carefully inspected for defects and found to be safe for use.

One was prepared as in example 1 and nickel plated as in example 4, giving a coating of 10 mils. Before being nickel coated, this bottle was undercoated with an anti-bonding film of colloidal graphite about 1 micron thick, as in example 6. This is in accordance with the present invention.

The other bottle was coated with a thin coating of "Electrodog + 502", a mixture of micro-sized graphite and vinyl resin made for electroplating by Atcheson & Co., Port Huron, Michigan. It was then electroplated with a coating of nickel 18 mils thick at a temperature of about 120° F. This is in accordance with the method disclosed by Outerbridge Jr. in U.S. Pat. No. 514,426, except in this instance the entire flask was coated with the metal.

Upon being subjected to the impart strength test described hereinbefore, the flask which was coated in accordance with the Outerbridge, Jr. procedure failed (broke) at 10 in. lbs. while the flask which represented the present invention did not fail even when it was subjected to an impact of 50 in. lbs.

What is claimed is:

1. A method for consistently manufacturing defect free nickel armored laboratory and industrial brittleware, which method consists essentially of the steps, in the order given, of
    (a) forming an anti-bonding layer on substantially the entire external surface of a unit of laboratory or industrial brittle-ware,
    (b) at an elevated temperature between about 350° F. and about 800° F., forming by chemical vapor deposition on said anti-bonding layer a layer of nickel having a thickness of about 10 mils, and
    (c) then lowering the temperature of the resulting nickel armored brittle-ware, to thereby strengthen said brittle-ware by subjecting it to a strong compressive force, whereby said anti-bonding layer prevents damage to said brittle-ware by said layer of nickel by preventing the development of stress concentrations due to unequal expansions and contractions of said layer of nickel and said brittleware.

2. A method for manufacturing laboratory and industrial glassware strengthened by an external coating of nickel and having a layer of an anti-bonding material disposed therebetween, said method consisting essentially of comprising the steps of
    (a) applying a solution or dispersion of an anti-bonding material to substantially the entire external surface of said glassware, said material being selected from the group consisting of thermally stable finely divided particles and thermally stable polymers;

(b) curing the coated glassware by heating for a time sufficient to dry the coating and form the layer or film of said anti-bonding material;
(c) applying a layer of nickel metal about 10 mils thick substantially to the entire external surface of said anti-bonding coated glassware by chemical vapor deposition, said vapor deposition being carried out at a temperature of from about 350° F. to about 550° F.; and
(d) cooling the resulting nickel-coated glassware whereby said nickel coating strengthens said glassware by subjecting it to a strong compressive force due to the deposition at elevated temperature and wherein said anti-bonding material prevents damage to said glassware by said nickel coating by preventing the development of stress concentrations due to unequal expansions and contractions of said nickel coating and said glassware.

3. A method as in claim 2, wherein the thickness of said nickel coating is between about 5 mils and about 100 mils, and said anti-bonding material is selected from the group consisting of graphite, molybdenum sulfide, polyfluorocarbons, talc, fluorocarbon resins and silicone resins.